United States Patent [19]
Negishi et al.

[11] Patent Number: 5,860,720
[45] Date of Patent: Jan. 19, 1999

[54] PROJECTION APPARATUS

[75] Inventors: Noriaki Negishi; Katsuhiro Yamashita; Akio Suzuki; Taishi Kunori, all of Tokyo, Japan

[73] Assignee: Sony Corporation, Tokyo, Japan

[21] Appl. No.: 722,577

[22] Filed: Oct. 1, 1996

[30] Foreign Application Priority Data

Oct. 3, 1995 [JP] Japan .................................. 7-256309

[51] Int. Cl.⁶ .................................................. G03B 21/20
[52] U.S. Cl. ............................................. 353/74; 353/87
[58] Field of Search .................................. 353/74, 75, 87, 353/85, 72, 73; 348/842, 787, 794

[56] References Cited

U.S. PATENT DOCUMENTS

| | | | |
|---|---|---|---|
| 1,283,590 | 11/1918 | Stavenhagen | 353/73 |
| 5,235,362 | 8/1993 | Kronbauer | 353/74 |
| 5,580,146 | 12/1996 | Maslow | 353/77 |
| 5,622,419 | 4/1997 | Holder et al. | 353/74 |

*Primary Examiner*—William Dowling
*Attorney, Agent, or Firm*—Jay H. Maioli

[57] ABSTRACT

A light source for use in a liquid-crystal rear projector serving as a projection apparatus can be changed from a front to thereby improve a performance of the apparatus. The liquid-crystal rear projector serving as the projection apparatus includes a light source accommodating portion provided at a front for accommodating therein a lamp house having a lamp light source, the lamp house being of a cartridge type accommodated in the light source accommodating portion, and a handling portion disposed at a front of the accommodated lamp house for explaining how to exchange the lamp house.

18 Claims, 6 Drawing Sheets

PROJECTION APPARATUS

FIELD OF THE INVENTION

The present invention relates to a rear projection apparatus, and more particularly, to a rear projection apparatus having a light source projecting light from the rear of a screen for projecting an image.

BACKGROUND OF THE INVENTION

Inasmuch as rear projection video apparatus, e.g., a liquid-crystal rear projector (hereinafter referred to as "liquid-crystal rear projection television") incorporating video devices including a liquid-crystal display portion (hereinafter referred to as "LCD"), an optical unit including a projection lens, a light source, a mirror, etc. and having a screen attached to an upper front thereof has been proposed.

A liquid-crystal rear projector is able to reduce its depth and to widen its screen, and such a liquid-crystal rear projector can be easily enlarged in size compared with a television receiver using a cathode-ray tube (CRT).

Figure 1:
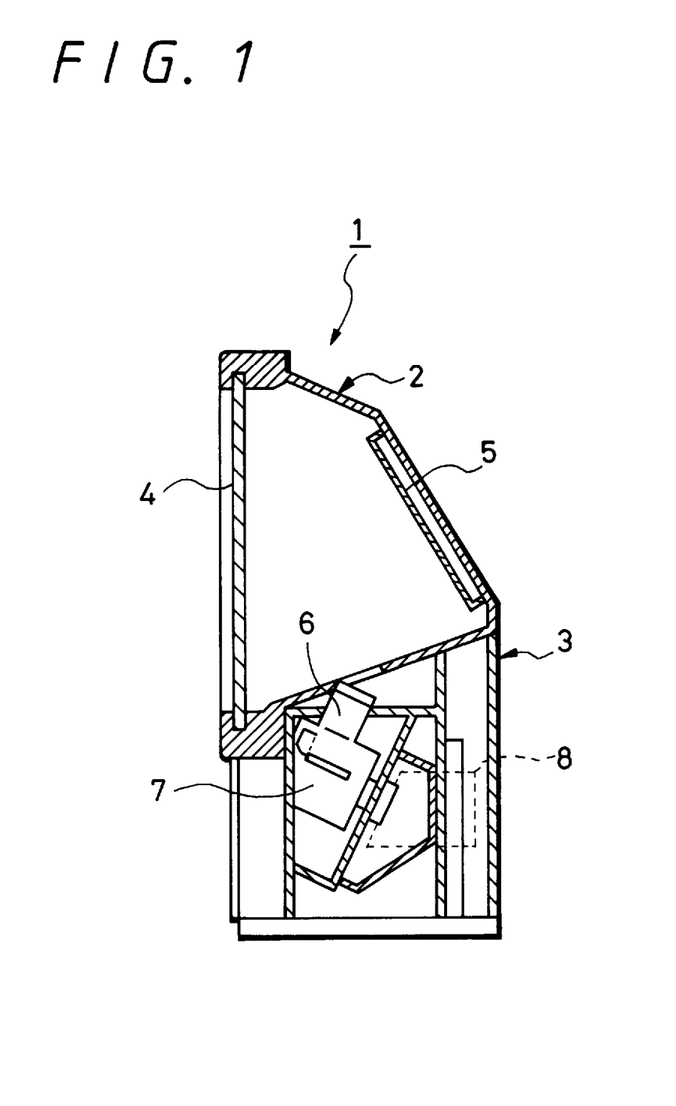
FIG. 1 is a side view of a liquid-crystal rear projector forming a known rear projection apparatus.

FIG. 1 of the accompanying drawings shows such liquid-crystal rear projector.

A liquid-crystal rear projector, generally depicted at reference numeral 1 in FIG. 1, comprises an upper cabinet 2 and a lower cabinet 3. The upper cabinet 2 houses a screen 4 disposed at the front surface and a mirror 5 for irradiating the screen 4 with rays of light of an image.

The lower cabinet 3 includes an optical unit 7 having a projection lens 6, a lamp house portion for irradiating the optical unit 7 with light and a control portion (not shown) for controlling the optical unit 7.

The lamp house portion 8 incorporates a lamp for generating light, although not shown. Since the incorporated lamp generates a heat of high temperature, the lamp is accommodated in the liquid-crystal rear projector from the rear side and hence cannot be easily exchanged, thereby protecting a user of the liquid-crystal rear projector from danger.

However, as described above, the lamp is set in and/or removed from the lamp house of the liquid-crystal rear projector from the rear side of the television receiver and therefore cannot be easily changed. As a result, when a rear projection type video apparatus is enlarged in size, such large-sized rear projection video apparatus faces a problem when the user changes a lamp, i.e., it is troublesome for the user to exchange a burned out lamp.

A life of a lamp used in the rear projection type video apparatus is not long compared with a television receiver having a CRT. If the lamp is burned out, then the rear projection type video apparatus cannot display a picture at all. Moreover, the rear projection type video apparatus become very much unreliable if it is repaired many times.

Furthermore, if the lamp is burned out, then such burned out lamp has to be exchanged by a technical expert because the lamp generates a heat of high temperature. Thus, such burned out lamp is not so easy to be exchanged, thereby requiring plenty of time for changing the lamp. Therefore, the user is unable to watch a desired picture for a long period of time compared with the case of the television receiver having the CRT.

As described above, a large-sized rear projection type video apparatus encounters the above-mentioned problem that a lamp, although it is indispensable for such rear projection type video apparatus as a light source, is not so long in life span and is not so easy to be exchanged when it is burned out.

SUMMARY OF THE INVENTION

It is therefore an object of the present invention to provide a rear projection apparatus in which a lamp house with a lamp housed therein can be easily exchanged.

According to a first aspect of the present invention, there is provided a projection video apparatus which is comprised of a lamp house having a light source for irradiating light from a rear of a screen, wherein the lamp house is attached to the projection apparatus so as to become exchangeable from a front of the projection apparatus body.

According to a second aspect of the present invention, there is provided a projection apparatus which is comprised of a cabinet, a screen disposed at a front of the cabinet, a lamp house having a light source therein, and accommodation means for accommodating the lamp house at the front of the cabinet, wherein the lamp house is changeable at the front of the cabinet.

According to a third aspect of the present invention, there is provided a projection apparatus which is comprised of a cabinet, a screen disposed at a front of the cabinet, a mirror disposed inside of a back of the cabinet, an optical unit disposed in the cabinet, a lamp house including a light source therein, and accommodation means for accommodating a light source at the front of the cabinet, wherein the lamp house is changeable at the front of the cabinet.

According to a fourth aspect of the present invention, there is provided a projection apparatus which is comprised of an upper cabinet, a lower cabinet, a screen disposed at a front of the upper cabinet, a mirror disposed inside of a back of the upper cabinet, a lamp house having an optical source therein, and accommodation means for accommodating the lamp house at the front of the lower cabinet, wherein the lamp house is changeable at the front of the lower cabinet.

According to a fifth aspect of the present invention, there is provided a projection apparatus which is comprised of an upper cabinet, a lower cabinet, a screen disposed at a front of the upper cabinet, a mirror disposed inside of a back of the upper cabinet, an optical unit having a projection lens and located at the lower cabinet, an optical unit having a projection lens and located at the lower cabinet, a lamp house having an optical source for projecting a light to the optical unit therein, and lamp house accommodation means for accommodating the lamp house, located at the front of the lower cabinet, wherein the lamp house is changeable at the front of the lower cabinet.

DETAILED DESCRIPTION OF THE INVENTION

A rear projection video apparatus, i.e., liquid-crystal rear projector according to the present invention will hereinafter be described in detail with reference to the drawings. In FIGS. 2 through 6, like elements and parts identical to those of FIG. 1 are marked with the same references in order to understand the present invention more clearly.

Figure 2:
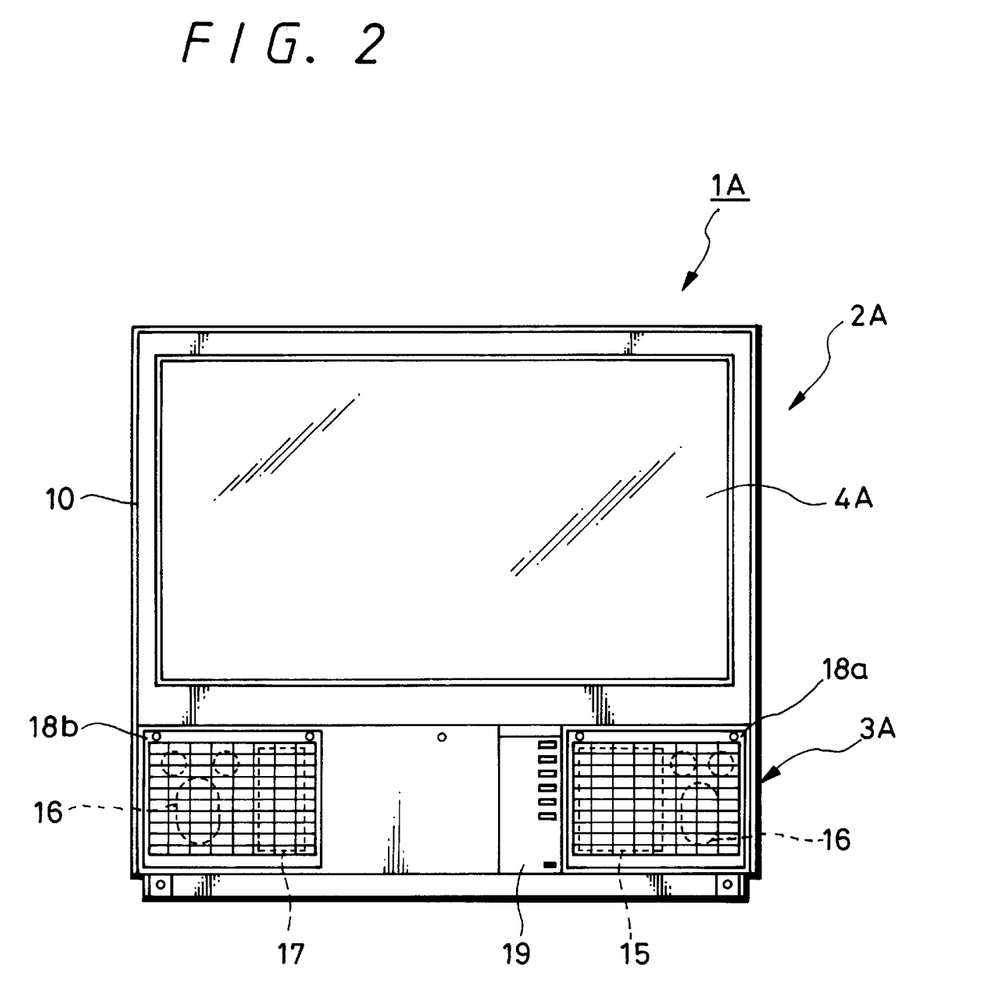
FIG. 2 is a front view of a liquid-crystal rear projector which is a rear projection apparatus according to the present invention.
Figure 3:
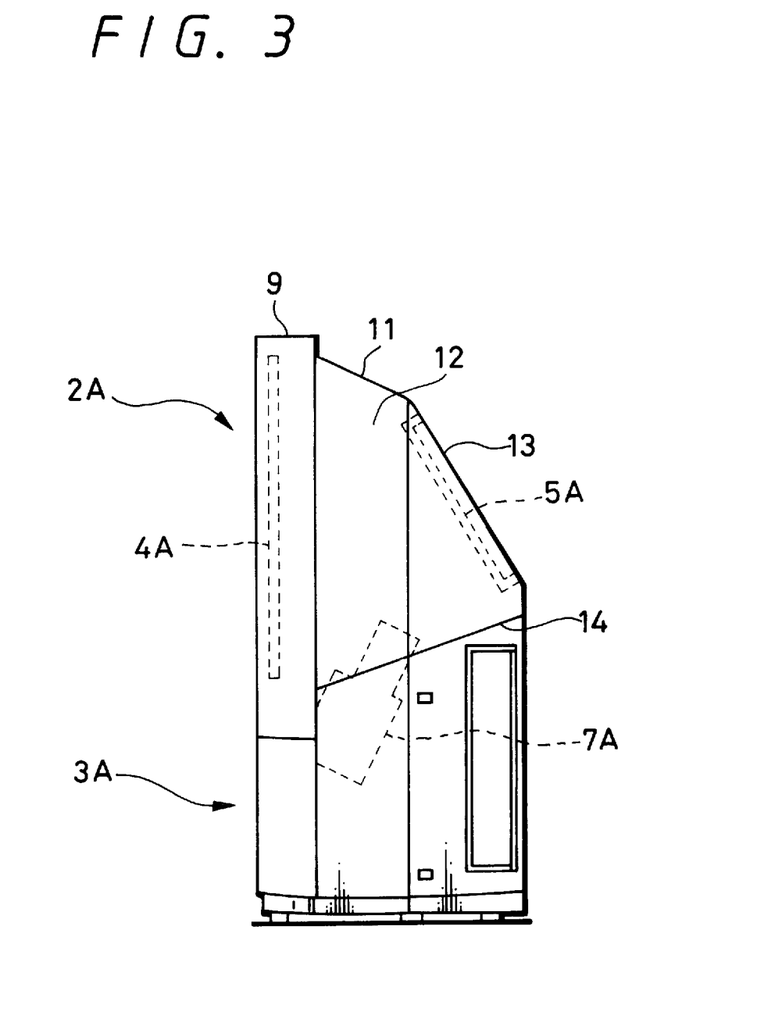
FIG. 3 is a side view of the liquid-crystal rear projector according to the present invention.

As shown in FIGS. 2 and 3, a liquid-crystal rear projector 1A comprises an upper cabinet 2A and a lower cabinet 3A.

The upper cabinet 2A has a rectangular frame portion 10 formed at the front thereof and a screen 4A is attached to the frame portion 10. As shown in FIG. 3, the upper cabinet 2A is of a box shape which is empty inside and with a closed circumference. Specifically, the upper cabinet 2A comprises an upper wall 11, respective side walls 12, a rear wall 13 and a bottom wall 14. A mirror 5A is attached to the inside of the rear wall 13 through a base (not shown).

The lower cabinet 3A is provided with all devices necessary for the liquid-crystal rear projector 1A except the picture screen 4A and the mirror 5A disposed on the upper cabinet 2A. An optical unit 7A, for example, having video devices including an LCD and a driver and a projection lens as main components is disposed at substantially the center portion of the lower cabinet 3A.

A light source portion 15 and a speaker 16 are disposed on the front of the lower cabinet 3A at the right-hand side of the center portion 3A shown in FIG. 2 (right-hand side as seen from the front in this embodiment). The light source portion 15 and the speaker 16 are covered and hidden with an ornamental first grille 18a with a number of through-holes defined therein.

The LCD is commercially available on the market and the optical unit 7A including the projection lens and is able to control color and density of RGB. The driver comprises a printed circuit board and a plurality of necessary electronic assemblies mounted on the printed circuit board. The light source might be a high-performance and high-brightness electric discharge lamp (HID lamp/100 W). The light source is of a cartridge type and can easily be exchanged from the front of the body of the liquid-crystal rear projector 1A as a unit including the lamp house with the lamp.

The speaker 16 and an air inlet 17 for cooling the internal optical unit 7A (see FIG. 3) are disposed on the left-hand side of the front of the lower cabinet 3A and hidden by a second grille 18b (serving as an ornamental plate) with a number of through-holes defined therein. An air from the air inlet 17 is sent by a fan (not shown) disposed within the liquid-crystal rear projector 1A to thereby cool the optical unit 7A.

An operator console unit 19 is attached to the front of the lower cabinet 3A at the position a little to the right of the center portion. Thus, the user is able to operate the liquid-crystal rear projector 1A in various ways by hand or through a remote commander (not shown).

As described above, the ornamental first and second grilles 18a, 18b detachably attached to the front of the liquid-crystal rear projector 1A hide the light source 15, the speaker 16 and the air inlet 17 to make the appearance of the liquid-crystal rear projector 1A satisfactory.

Inasmuch as the first and second grilles 18a, 18b are detached from the front while the liquid-crystal rear projector 1A is not displaced or moved from the installed position, the user can easily exchange the light source of the light source portion 15 and a filter of the air inlet 17.

Figure 4:
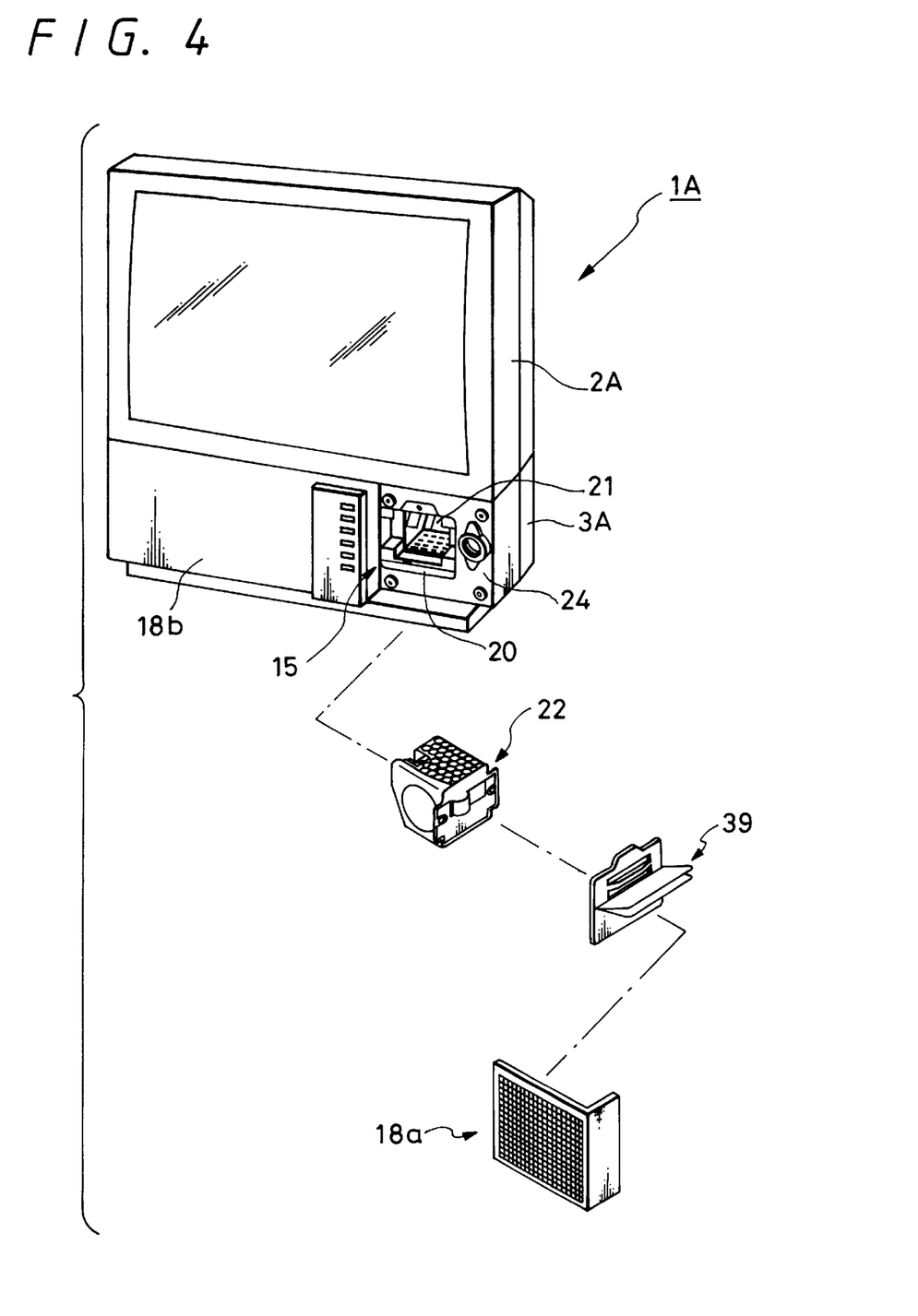
FIG. 4 is an exploded perspective view illustrating a light source portion of the liquid-crystal rear projector according to the present invention.

As shown in FIG. 4, the light source portion 15 is disposed to the right on the front of the lower cabinet 3A of the liquid-crystal rear projector 1A. The light source portion 15 comprises a light source accommodation portion 20 disposed in the body of the lower cabinet 3A, a lamp house accommodation portion 21 properly positioned and fixed within the light source accommodation portion 20, a lamp house 22 having the above-mentioned high-brightness electric discharge lamp, a protection cover 39 having a handling means and the first grille 18a with a number of through-holes defined therein through which sounds are passed and an air is sent.

Figure 5:
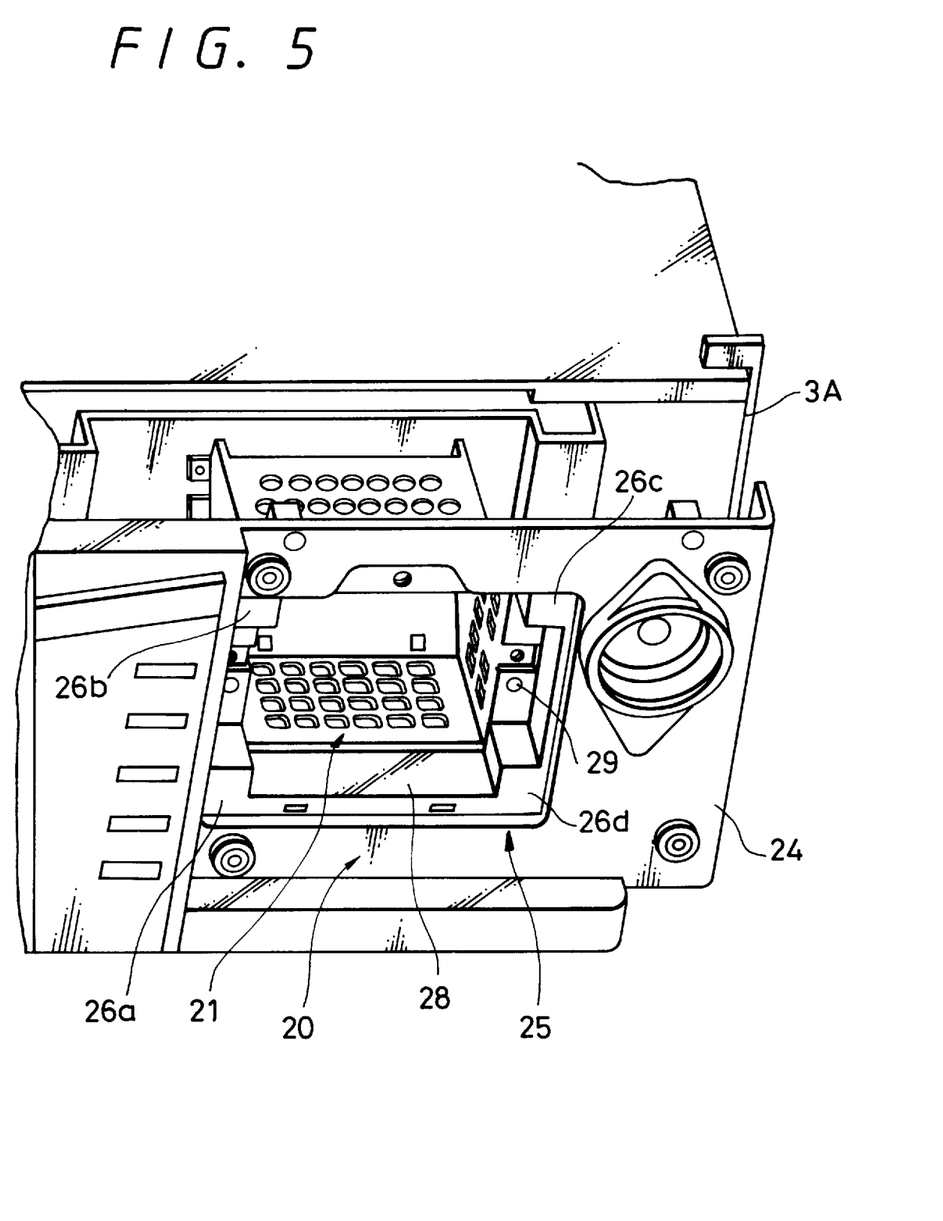
FIG. 5 is a perspective view illustrating the light source portion of the liquid-crystal rear projector according to the present invention.

As shown in FIG. 5, the light source accommodation portion 20 comprises a light source accommodation frame 25 formed on a frame 24 disposed at the front of the lower cabinet 3A and the lamp house accommodation portion 21. The lamp house accommodation portion 21 is attached to the light source accommodation portion 20 and the frame 24 is disposed at the front of the lamp house accommodation portion 21.

As shown in FIG. 5, the light source accommodation frame 25 is a substantially square window and includes at its four corners engagement protrusions 26a through 26d serving as not only reinforcing members but also as guides for guiding the lamp house 22.

Figure 6:
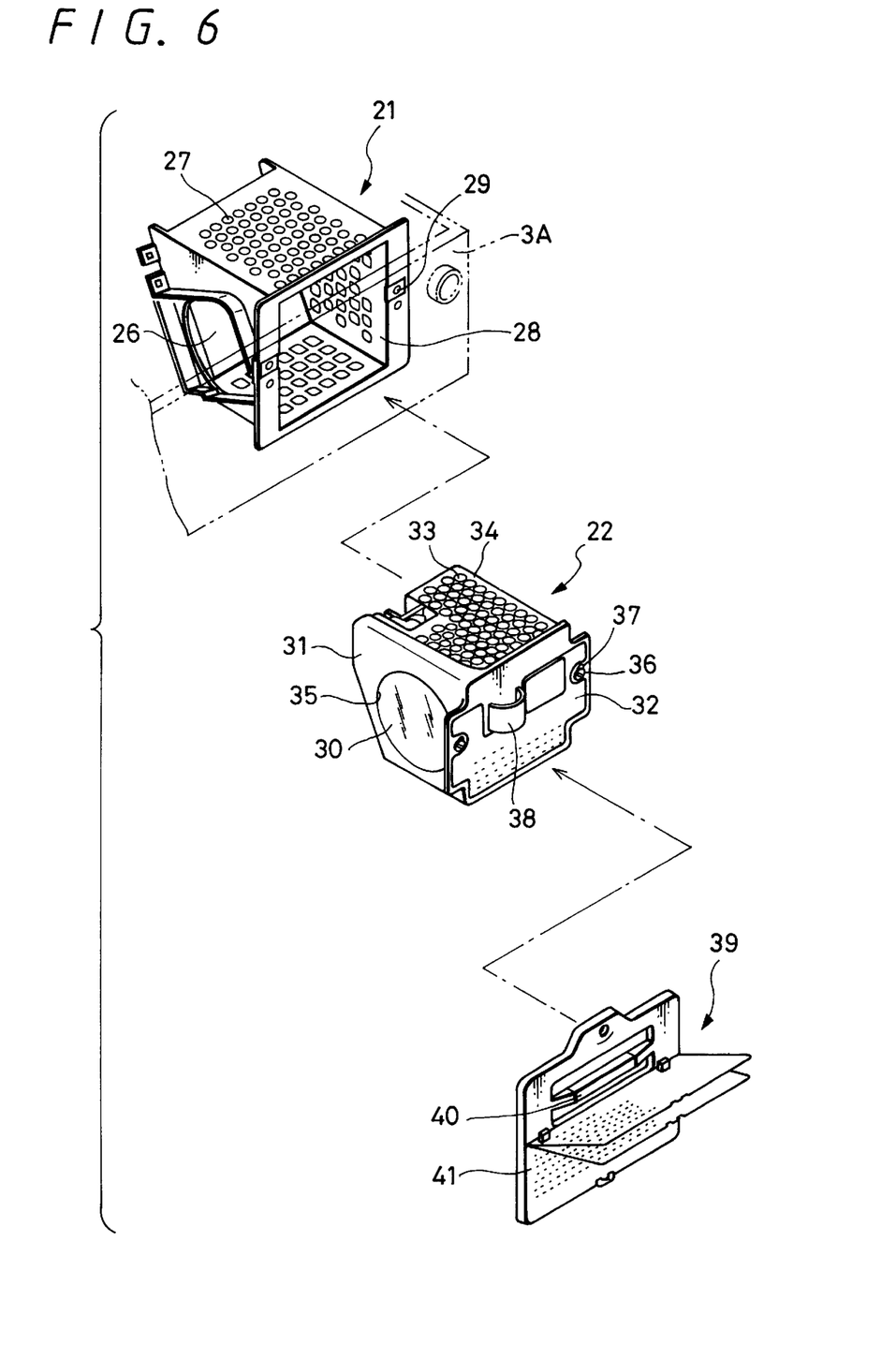
FIG. 6 is an exploded perspective view illustrating the light source portion.

As shown in FIG. 6, the lamp house accommodation portion 21 is of a substantially square basket made of a heat-insulating material and has a diamond-shaped light path window 26 formed on the left-hand side surface with respect to the direction in which it is attached to the light source accommodation portion 20 and a number of through-holes 27 of predetermined size defined on the remaining three side surfaces thereof. Further, the lamp house accommodation portion 21 has on the end edge of an opening portion 28 defined a screw hole portion 29 with which the lamp house 22 is engaged.

As shown in FIG. 5, the light source accommodation portion 20 accommodates the lamp house accommodation portion 21 at the light source accommodating position of the lower cabinet 3A body and is placed and fixed by fittings disposed on the upper portion and screws disposed on the rear, whereafter it is covered with the frame 24, thus resulting in the light source accommodation portion 20 being completed.

The lamp house 22 will be described below.

As shown in FIG. 6, the lamp house 22 is of a square shape similar to the lamp house accommodation portion 21. The lamp house 22 comprises a lamp supporting portion 31 composing a left side in the accommodating direction and a front side, the left side and the front side being elongated at a right angle, the lamp supporting portion 31 made of a heat-insulating material for supporting a lamp 30, a grip portion 32 integrally formed with the front of the lamp supporting portion 31 by the same heat-insulating material and a mesh-like lamp cover portion 34 made of a metal material and whose right, rear, top and bottom surfaces are elongated at right angles, each having a number of through-holes 33 defined therein.

The lamp supporting portion 31 includes a circular window portion 35 for supporting the lamp 30 with the front glass surface of the lamp 30 being opposed to the outside.

The grip portion 32 includes a screw portion 37 positioned at the front of the lamp house 22, the screw portion 37 having fixing screws 36 at respective sides. How to handle the lamp 30 is written on the lower portion of the grip portion 32 and a grip 38 is attached to the upper portion of the grip portion 32. The screws 36 fitted into the screw portions 37 may be hexagon socket-head cap screws which cannot be easily detached without a hexagon head wrench. It is needless to say that the screws 36 are not limited to the above-mentioned hexagon head screws.

The grip 38 is of a substantially semi-circular blind hole opened in the upper portion and the lower portion positioned on the upper portion of the position at which how to handle the lamp 30 is written at the position a little to the right-hand side from the center position. Therefore, the user can attach or detach the lamp house 22 to and from the lamp house accommodation portion 21 with the grip 38 by the thumb of the right or left hand inserted into the grip 38 from the upper direction and the index finger inserted into the grip 38 from the lower direction while holding the grip portion 32 by the backs of other fingers at its position near the position in which how to handle the lamp 30 is written. Specifically, the user holds the grip 38 with the thumb and the index finger, and it is difficult for the user to hold the grip 38 with the rest of the fingers. Also, the grip 38 makes it possible for the user to hold the lamp 30 stably and urges the user to handle the lamp 30 with care when the user changes the lamp 30.

As shown in FIG. 6, the protection cover 39 is of a substantially square shape which comprises a bar-like knob 40 having extended there across respective lateral grooves as a handling portion and located under the knob portion are written instructions 41 on how to exchange the lamp 30. The protection cover 39 is engaged with the lamp house accommodation portion 21 after the lamp house 22 was accommodated in the lamp house accommodation portion 21. The protection cover 39 alerts the user to the attention that the lamp 30 generates a heat of high temperature when the user exchanges the lamp. Therefore, the user has to exchange the lamp 30 with great care. Furthermore, the instructions 41 on how to exchange the lamp 30 are written below the handling portion 40 in order for the user to exchange the lamp 30, and hence the user can exchange the lamp 30 easily and correctly.

As shown in FIG. 4, the lamp house accommodation portion 21 is disposed in the light source accommodation portion 20 of the liquid-crystal rear projector 1A and the lamp house 22 is inserted into the light source portion 15 from the front and engaged with the light source portion 15. Concurrently therewith, a connector (not shown) disposed on the rear of the lamp house 22 for energizing the lamp 30 is connected to the body of the liquid-crystal rear projector 1A. Then, a lens surface irradiated with light from the lamp 30 is opposed to the outside through the light path window portion 26 (see FIG. 6). The protection cover 39 is attached to the lamp house 22 on which the first grille 18a serving as the ornamental plate is assembled, thereby the light source portion 15 being completed. As described above, the lamp house 22 having the lamp 30 for irradiating the screen with light from the back is formed as the cartridge type and the user can exchange the lamp house 22 from the front of the liquid-crystal rear projector 1A.

As described above, the rear projection video apparatus according to the present invention includes the lamp house having the light source for irradiating the screen with light from the back and this lamp house can be exchanged at the front of the rear projection video apparatus. Therefore, even when the rear projection video apparatus is large in size, the user can change the projection lamp at the front of the apparatus without moving the apparatus from the installed position.

Moreover, since the lamp house has the light source which is covered with the mesh-like member and includes the grip formed of the heat-insulating member, the user can safely handle the lamp which generates a heat of high temperature.

Furthermore, since the protection cover member disposed at the front of the lamp house includes the handling means for explaining how to handle the lamp house, it can be instructed that those who are not skilled in the art can safely exchange the lamp. Therefore, it is possible to call the user's attention to the fact that the user should exchange the lamp with care.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A projection apparatus having a cabinet and a screen, the apparatus comprising:

a lamp house having a light source for producing light and irradiating a rear of the screen, wherein said lamp house is attached to the cabinet so as to become removable from a front of the cabinet facing the screen; and a protection cover member for covering a front of said lamp house and wherein said protection cover member has instruction means for explaining to a user of the projection video apparatus how to handle said lamp house.

2. A projection apparatus according to claim 1, wherein said lamp house includes a cover formed of a mesh-like member and further includes a grip formed of a heat-insulating member.

3. A projection apparatus comprising:

a cabinet;

a screen disposed at a front of said cabinet;

a lamp house having a light source therein;

accommodation means for accommodating said lamp house at said front of said cabinet, wherein said lamp house is removable from said front of said cabinet; and a cover arranged over a front side of said lamp house, wherein said cover includes instruction means for explaining to a user of the projection apparatus how to remove said lamp house.

4. A projection apparatus according to claim 3, wherein said lamp house includes a lamp cover having a plurality of holes formed therein.

5. A projection apparatus according to claim 3, wherein said lamp house includes gripping means for use by a user of the projection apparatus in removing said lamp house from said cabinet and for setting said lamp house into said cabinet.

6. A projection apparatus comprising:

a cabinet;

a screen disposed at a front of said cabinet;

a mirror disposed inside said cabinet at a back portion thereof;

an optical unit disposed in said cabinet;

a lamp house including a light source mounted therein;

accommodation means for accommodating said lamp house at said front of said cabinet, wherein said lamp house is removable from said front of said cabinet; and a cover arranged over a front side of said lamp house, wherein said cover includes instruction means for explaining to a user of the projection apparatus how to remove said lamp house.

7. A projection apparatus according to claim 6, wherein said lamp house includes a lamp cover having a plurality of holes formed therein.

8. A projection apparatus according to claim 6, wherein said lamp house includes gripping means for use by a user of the projection apparatus in removing said lamp house from said cabinet and for setting said lamp house into said cabinet.

9. A projection apparatus comprising:

an upper cabinet;

a lower cabinet arranged below said upper cabinet;

a screen disposed at a front of said upper cabinet;

a mirror disposed inside said upper cabinet at a back portion thereof;

a lamp house including an optical light source arranged therein;

accommodation means for accommodating said lamp house at said front of said lower cabinet, wherein said lamp house is removable from said front of said lower cabinet; and a cover arranged over a front of said lamp house, wherein said cover includes instruction means for explaining to a user of the projection apparatus how to remove said lamp house.

10. A projection apparatus according to claim 9, wherein said lamp house includes a lamp cover having a plurality of holes formed therein.

11. A projection apparatus according to claim 9, wherein said lamp house includes gripping means for use by a user of the projection apparatus in removing said lamp house from said lower cabinet and for setting said lamp house into said lower cabinet.

12. A projection apparatus comprising:

an upper cabinet;

a lower cabinet arranged below said upper cabinet;

a screen disposed at a front of said upper cabinet;

a mirror disposed inside said upper cabinet at a back portion thereof;

an optical unit having a projection lens and located in said lower cabinet;

a lamp house having a light source for projecting a light to said optical unit; and lamp house accommodation means arranged in said lower cabinet for accommodating said lamp house and being located at said front of said lower cabinet, wherein said lamp house is removable from said front of said lower cabinet.

13. A projection apparatus according to claim 12, wherein said lamp house includes a lamp cover having a plurality of holes formed therein.

14. A projection apparatus according to claim 12, wherein said lamp house includes gripping means for use by a user of the projection apparatus in removing said lamp house from said lower cabinet and for setting said lamp house into said lower cabinet.

15. A projection apparatus according to claim 12, further comprising a cover arranged over a front side of said lamp house.

16. A projection apparatus according to claim 15, wherein said cover includes instruction means for explaining to a user of the projection apparatus how to remove said lamp house.

17. A projection apparatus according to claim 12, further comprising two speakers located at a right side and a left side of said lower cabinet, respectively.

18. A projection apparatus according to claim 12, further comprising a grille cover located at the front of said lower cabinet for covering said lamp house.

* * * * *